April 22, 1941.                N. B. NEWTON                2,239,568
                             CENTRIFUGAL CLUTCH
                             Filed Dec. 8, 1937            3 Sheets-Sheet 1

Inventor:
Noel B. Newton

By his Attorney:

April 22, 1941.  N. B. NEWTON  2,239,568
CENTRIFUGAL CLUTCH
Filed Dec. 8, 1937  3 Sheets-Sheet 2

Inventor:
Noel B. Newton
By his Attorney: Walter Gunn

April 22, 1941.   N. B. NEWTON   2,239,568
CENTRIFUGAL CLUTCH
Filed Dec. 8, 1937   3 Sheets-Sheet 3

Patented Apr. 22, 1941

2,239,568

UNITED STATES PATENT OFFICE 2,239,568

CENTRIFUGAL CLUTCH

Noel Banner Newton, Acton, London, England

Application December 8, 1937, Serial No. 178,666
In Great Britain December 15, 1936

11 Claims. (Cl. 192—105)

This invention relates to automatic centrifugal clutches and more particularly to automatic centrifugal clutches of the kind having manually operable clutch withdrawal mechanism and wherein the closing pressure of the clutch is obtained by centrifugally actuated members acting in combination with a spring, means being provided for holding said spring in an initially loaded or shortened condition to permit automatic clutch release on release of the said closing pressure.

It has been appreciated that simple automatic clutches of the centrifugal type have one serious disadvantage, namely that clutch engagement can only be obtained by driving the part which carries the centrifugal elements. This presents the obvious disadvantages that, if the clutch is fitted to an automobile, the engine cannot be started by towing the vehicle, because the clutch remains automatically disengaged while the engine is stationary. For that reason it has been proposed to provide means for manually engaging the clutch so that the normal manually operated clutch-withdrawing mechanism may be operated to produce a closing pressure instead of effecting clutch withdrawal and such means has been constructed so that it is centrifugally controlled and becomes operable only when the part carrying the main centrifugal elements is stationary or rotating at slow speeds below that for automatic clutch engagement.

In another type of centrifugal automatic clutch, ordinary clutch springs are provided, coupled to and opposing which are stronger withdrawal springs, the centrifugally actuating members operating directly against the withdrawal springs to permit the clutch springs to provide the clutch closing pressure. In such type of automatic clutch, means have been proposed, including uncoupling mechanism whereby the withdrawal springs may be uncoupled and rendered inoperative at slower speeds or while the clutch is stationary, the clutch becoming operable as an ordinary clutch through manually operable clutch withdrawal mechanism.

In such latter type of automatic centrifugal clutch the problems are entirely different from those of the former type, as the centrifugal members merely release and do not provide the clutch-closing pressure, which pressure is obtained from normal clutch springs having no movement limitation. In the former type of clutch to which the present invention relates, the clutch-closing pressure must be transmitted by the centrifugally actuated members acting in combination with springs having means which limit their extension to provide clearance for clutch disengagement.

The present invention is based on an appreciation of the fact that the springs in such former type of clutch, though normally acting only as cushions, can easily be of such a strength and rating as to constitute in themselves a source of potential energy for providing clutch-closing pressure while centrifugally generated pressure is unavailable or insufficient for such purpose, and the object of the present invention is to provide means to make such potential energy voluntarily available for such purpose.

According to the invention, an automatic centrifugal clutch of the kind having voluntarily operable clutch-withdrawal mechanism and wherein the clutch-closing pressure is obtained by centrifugally actuated members acting in combination with a spring having means for holding said spring in an initially loaded or shortened condition to permit automatic clutch release, characterised by means for over-riding the automatic clutch release comprising means for voluntarily releasing said spring so that it may extend beyond its said shortened condition to maintain or establish clutch-closing pressure.

In the accompanying drawings—

Figures 1, 5:
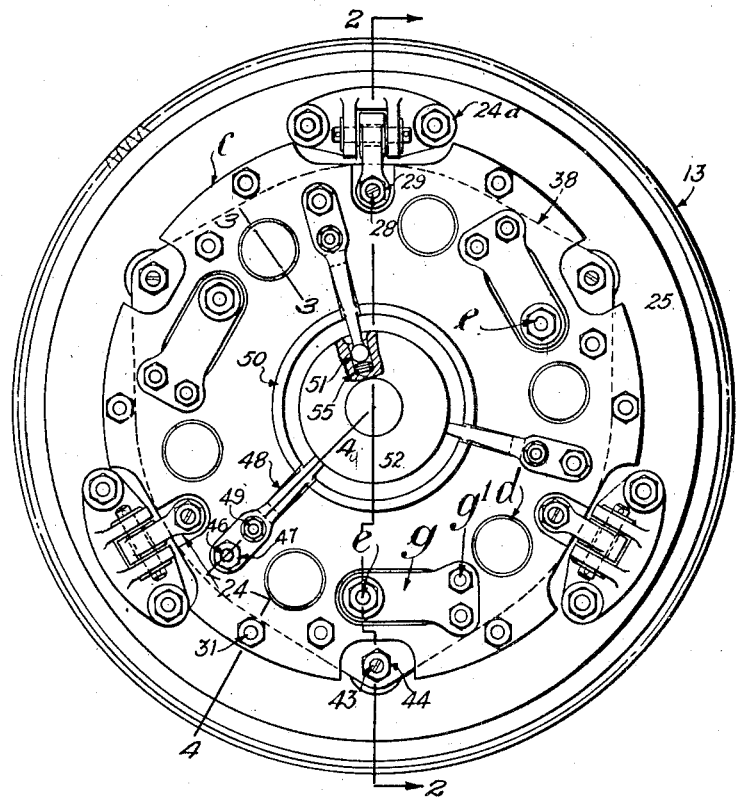
Fig. 1 is a front elevation of a complete clutch.
Fig. 5 is a detail view of the centrifugal mass as seen in the direction of arrow A on Fig. 2 and in part section on line 5—5.
Figures 2, 3:
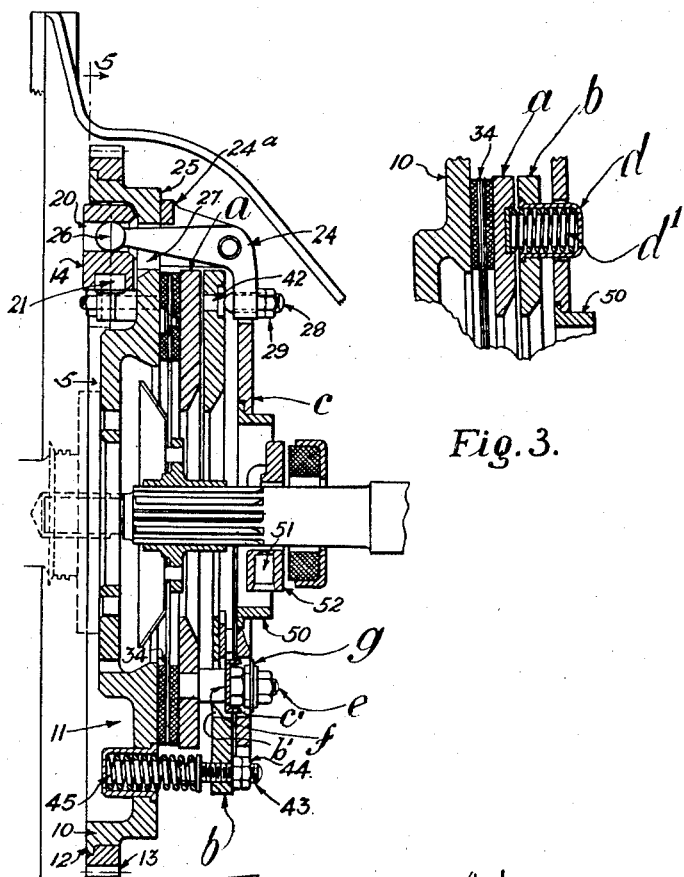
Fig. 2 is a sectional elevation on line 2—2 of Fig. 1.
Fig. 3 is a fragmentary section on line 3—3 of Fig. 1.

As illustrated, the fly-wheel 10 is formed with an annular recess 11 behind the friction face and at the maximum possible diameter consistent with providing a flange 12 to receive the usual starter ring 13. This annular recess, like the rest of the fly-wheel, is preferably machined to simplify balancing and also at the same time to facilitate mounting of the centrifugal masses. The centrifugal masses 14 (see Figs. 2 and 5) are of flat shape, having a curved and preferably machined outer periphery 15 to engage the outer periphery of the recess. The inner periphery of the mass may be curved or flat (as shown) while the sides are formed parallel with each other and parallel to the centre radius of the outer periphery. Secured by bolts 16 to the back of the recess are guide pieces 17, between which the mass 14 is slidably mounted, such guide pieces having grooves 18 in their edges, adapted to be engaged by pairs of rollers 19 mounted in slots in the edges of the mass. On the centre radius of the mass is formed a through hole 20, disposed rather nearer the outer periphery, while on the inner edge of the mass is formed a recess in which is fitted a fibre or like plug 21 to silence the engagement of the mass with the inner periphery of the recess. On each side of the mass and in the central plane thereof are parallel holes, opening into the outer periphery of the mass, and in which holes are slidably located hollow plungers 22 each having a return spring 23 seated at the bottom of the hole. The centrifugal mass is thus slidably located for limited radial movement and is at the same time held clear of the back face of the fly-wheel and mounted for anti-frictional movement.

Three operating centrifugal levers 24 are provided, each pivotally mounted in a bracket member 24$^a$ adapted to be separately bolted to the outer face 25 of the fly-wheel, the end 26 of the levers being ball-shaped and adapted to pass through a slot 27 in the fly-wheel face to engage the hole 20 in the centrifugal mass. The levers 24 are bellcrank in shape, and their shorter ends are fitted with spherical headed presser studs 28, each screwing into the lever and secured by a pair of lock nuts 29.

Figure 4:
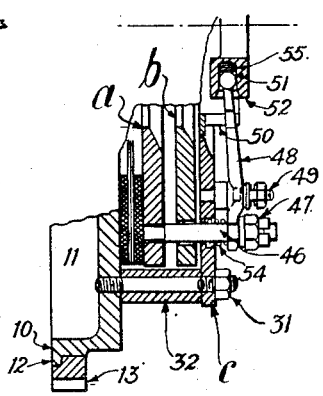
Fig. 4 is a fragmentary section on line 4—4 of Fig. 1.

The remaining parts of the clutch which are to be secured to the fly-wheel are all secured to or assembled on a back plate $c$ which as shown in Fig. 4 is secured by studs 31 fixed in the face of the fly-wheel and having spacing collars 32. Such parts comprise a driving plate $a$ having a friction surface complementary to that on the fly-wheel and between which the centre disc member 34 is to be gripped.

Figure 7:
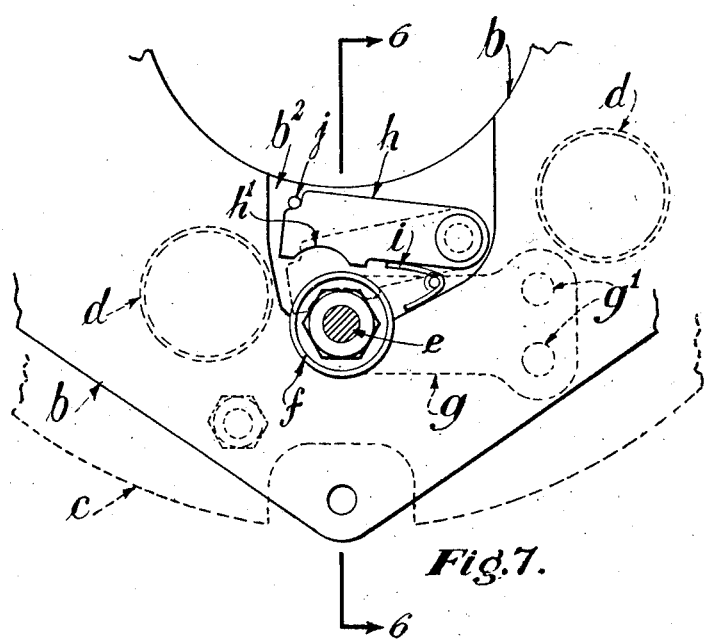
Fig. 7 is a part front elevation on line 7—7 of Fig. 6.

Between the driving plate $a$ and the back plate $c$ is a spring plate $b$, whilst between the plates $a$ and $b$ are coil springs $d^1$ which are held in cup-like stampings $d$ fitted into holes in the plate $b$ and having flanges resting against that plate. The springs project from the cup and rest against the plate $a$, the position of these springs being shown dotted in Fig. 7. Fixed in the presser driving plate $a$ are studs $e$ carrying cup-shaped washers $f$ forming shoulders which are adapted to pass through clearance holes $b^1$ and $c^1$ in the spring plate $b$ and back plate $c$ respectively. The studs $e$ are fixed by means of nuts $e^1$ in the ends of flat spring blades $g$ secured to the outer face of the back plate $c$ by screws $g^1$ as shown dotted in Fig. 7. The plate $a$ is thus permitted sufficient movement for engagement and disengagement of the friction surfaces, whilst any torque transmitted to it by friction is positively and resiliently transmitted through the studs $e$ and spring blades $g$ and loaded sliding surfaces are therefore eliminated.

Figure 6:
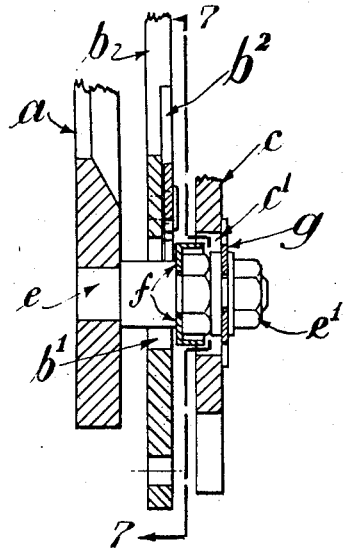
Fig. 6 is an enlarged sectional elevation of part of Fig. 2 and taken on line 6—6 of Fig. 7.

A recess $b^2$ is provided milled in the face of the plate $b$ in the locality of each stud $e$, in which recess is pivoted a flat lever $h$, the end $h^1$ of which is adapted to engage behind the shoulder formed by the washer $f$ when in the dotted position, thus providing the means for holding the springs $d^1$ in the required initially loaded or shortened condition to permit automatic clutch release on release of the closing pressure from the centrifugally actuated members. A weak spring $i$ is provided which can return the lever to the position shown in full lines as determined by the stop $j$ but friction contact preventing such movement will normally be established between the washer $f$ and the lever $h$ before the spring $i$ will overcome the centrifugal force on the lever. As in this construction the holes $b^1$ are clearance holes when the parts are in the position shown in Fig. 6, the studs 46 are arranged to locate and slidably carry the plate $b$. The spring $i$ is made of such strength, relative to the centrifugal mass of the lever $h$, that it will yield to allow the lever to assume, under centrifugal action, the position shown in dotted lines when the clutch is rotating at relatively slow speeds, below those at which the centrifugal mechanism of the clutch would have allowed the plates $a$ and $b$ to separate far enough for the washer $f$ to have engaged the end $h^1$ of the lever as the clutch speed falls. After such engagement, friction prevents the spring $i$ from moving the lever as the washer $f$ engages the lever $h$ while the latter is still held by centrifugal force in the position shown in dotted lines in Fig. 7.

The plate $b$ carries renewable studs 42 adapted to be engaged by the presser studs 28. The plate $b$ also carries studs 43 adjustably screwing therein and secured by lock nuts 44, the heads of such studs being adapted to receive clutch-separating springs 45. The plate $b$ is slidable over the studs $e$ under the action of the levers 24 against the adjustable pressure of the springs 45 and applies driving pressure to the plate $a$ through the springs $d^1$. The centrifugal masses and the levers are arranged so that such masses engage the outer periphery of the annular groove while an appreciable space still remains between the plates $a$ and $b$.

Voluntary disengagement of the clutch is therefore obtainable by means of studs 46 fixed in the plate $a$, slidable through the plates $b$ and $c$, and carrying adjustable nuts 47. Engaging such nuts are levers 48 mounted on pivot studs 49 secured to the backplate $c$, the ends of the levers passing through guide slots in a flange 50, secured to the backplate, and such ends being located in sockets 51 provided in a thrust ring 52. Anti-vibration and locating springs 54 and 55 are provided on the studs 46 and in the sockets 51 respectively.

As will be seen, the centrifugal masses 14 and their guide pieces may be mounted on the fly-wheel and the latter, with such assembly, balanced as a separate unit. The clutch assembly, that is to say, the other parts which are to be secured to the fly-wheel may, with the exception of the levers themselves, be assembled on the backplate $c$, and balanced as a separate unit. When assembling the clutch, the fly-wheel may, therefore, be bolted to the engine crank-shaft with the centrifugal masses in position. The backplate $c$ as a balanced assembly, may then be bolted to the fly-wheel after the centre disc member 34 has been slipped on to its shaft and finally the brackets 24$^a$ carrying the levers 24 may be bolted to the fly-wheel, the ends 26 of the levers being inserted through the slots in the fly-wheel to engage the holes 20 in their centrifugal masses.

The operation of the mechanism is as follows:

Normally, the levers $h$ will be in the position shown in dotted lines and will limit the extension of the springs between the plates $a$ and $b$ by engagement behind the shoulders formed by the washers $f$. The clutch will, therefore, operate as an automatic centrifugal clutch and the springs between the plates $a$ and $b$ merely operate as cushion springs through which the closing pressure of the levers 24 of the centrifugal mechanism reaches the friction element of the clutch. If, however, the clutch is stationary or rotating very slowly and the manual clutch-withdrawal mechanism (not shown) is operated to withdraw the driving plate $a$, the spring plate $b$ being already automatically withdrawn against stops, such as the studs 28, the pressure on the levers $h$ is released and by reason of their springs $i$, they assume their innermost and disengaged positions, as shown in full lines in Fig. 7. On releasing the manually operated clutch-withdrawal mechanism, the springs $d^1$ between the plates $a$ and $b$ are permitted to extend beyond their previous limit, drawing the washers $f$ past the levers $h$ and into the clearance holes $b^1$ in the plate $b$ until, under the potential pressure in the springs, the driving plate $a$ is brought against the friction elements of the clutch, as in an ordinary clutch, with pressure sufficient to provide effective torque transmission. Thereafter, the clutch is under manual control, as in an ordinary non-automatic clutch, and may be used to start the engine through the momentum of the vehicle or by towing assistance. As soon however as the engine has started or when the speed of the clutch is sufficient, the levers $h$ move towards their dotted positions under centrifugal force and against the action of their springs $i$, until they rest on the periphery of the cup-shaped washers $f$. If the manual clutch-withdrawal mechanism is now operated sufficiently, or if the engine and clutch speed rise sufficiently, the studs $e$ with their washers $f$ will be moved through the plate $b$ far enough for the levers to move into position behind their washers and the clutch again becomes fully automatic.

The adjustment and operation of the other parts of the clutch is sufficiently obvious to require no further explanation, but emphasis is laid upon the fact that the springs 23 in the centrifugal masses 14 enable a considerable amount of the load to be relieved from the operating levers 24 because they can be arranged to resist centrifugal action until a predetermined speed of revolution has been attained. The clutch withdrawal springs 45 can, therefore, be comparatively light, and the weight and mass of the operating levers 24 can be reduced to a minimum. As already stated, attention is also directed to the method of supporting the plate $a$ for axial movement with positive rigidity and transmission of the drive, while avoiding any sliding splines or like surfaces.

The invention is obviously not limited to the details and arrangement of parts in the above described example, many of which are clearly capable of modification without departing from the nature of the invention, so that the above description must be taken by way of example and not by way of limitation.

The expression "manually operated" as used herein, is obviously intended to mean or include the usual clutch pedal operating mechanism.

What I claim is:

1. The combination with an automatic clutch embodying relatively movable co-acting friction members, and means responsive to the rotative speed of the driving member for moving said members into engagement above a predetermined rotative speed, including a resilient member comprising springs having catch means for holding them in a pre-loaded condition to permit clutch release below the predetermined rotative speed, said springs being arranged to be further compressed by said movement and determining the pressure of engagement of the said members; manual means for disengaging said members by compressing said resilient member and means for releasing such catch means so that the resilient member may effect engagement of the said co-acting friction members below the said rotative speed and under the control of the said manual means, said catch means comprising a stud, having a shoulder, and a pivoted catch adapted to be engaged with or disengaged from the said shoulder.

2. The combination with an automatic clutch embodying relatively movable co-acting friction members, and means responsive to the rotative speed of the driving member for moving said members into engagement above a predetermined rotative speed, including a resilient member comprising springs having catch means for holding them in a pre-loaded condition to permit clutch release below the predetermined rotative speed, said springs being arranged to be further compressed by said movement and determining the pressure of engagement of the said members; manual means for disengaging said member by compressing said resilient member and means for releasing such catch means so that the resilient member may effect engagement of the said co-acting friction members below the said rotative speed and under the control of the said manual means, said catch means comprising a stud, having a shoulder and a pivoted catch adapted to be engaged with or disengaged from the said shoulder, the pivoted catch member being movable in one direction by a spring and in the other direction by centrifugal force.

3. The combination with an automatic clutch embodying relatively movable co-acting friction members, and means responsive to the rotative speed of the driving member for moving said members into engagement above a predetermined rotative speed, including a resilient member comprising springs having catch means for holding them in a pre-loaded condition to permit clutch release below the predetermined rotative speed, said springs being arranged to be further compressed by said movement and determining the pressure of engagement of the said members; manual means for disengaging said members by compressing said resilient members and means for releasing such catch means so that the resilient member may effect engagement of the said co-acting friction members below the said rotative speed and under the control of the said manual means, said catch means comprising a stud, having a shoulder, a pivoted catch adapted to be engaged with or disengaged from the said shoulder, the catch being pivoted so as to be removed by centrifugal force into engagement with the shoulder, and a light spring adapted to move the catch out of engagement with the shoulder, the spring being of such strength as to be normally overpowered by centrifugal force and unable to release the catch whilst loaded.

4. The combination with an automatic clutch embodying relatively movable coacting friction members, and means responsive to the rotative speed of the driving member for moving said members into engagement above a predeter- mined rotative speed, including a resilient member comprising springs having catch means for holding them in a pre-loaded condition to permit clutch release below the predetermined rotative speed, said springs being arranged to be further compressed by said movement and determining the pressure of engagement of the said members; manual means for disengaging said members by compressing said resilient member and means for releasing such catch means so that the resilient member may effect engagement of the said co-acting friction members below the said rotative speed and under the control of the said manual means, said catch means comprising a stud, having a shoulder and a pivoted catch adapted to be engaged with or disengaged from the said shoulder, the said stud also acting to carry one of the movable co-acting friction members for the direct transmission of torque.

5. The combination with an automatic clutch embodying relatively movable coacting friction members, and means responsive to the rotative speed of the driving member for moving said members into engagement above a predetermined rotative speed, including a resilient member, manual means for disengaging said members, and catch means for holding the resilient member in a preloaded condition to permit clutch release below the predetermined rotative speed, and means for releasing the said catch means of the resilient member so that the said resilient member may effect engagement of the co-acting friction members below the said predetermined rotative speed and under the control of the said manual means, said catch means being separate from the said manual means.

6. The combination with an automatic clutch embodying relatively movable co-acting friction members, and means responsive to the rotative speed of the driving member for moving said members into engagement above a predetermined rotative speed, including a resilient member comprising springs, manual means for disengaging said members by compressing said resilient member, catch means separate from said manual means for holding said springs in a pre-loaded condition to permit clutch release below the predetermined rotative speed and said springs being arranged to be further compressed by said movement and determining the pressure of engagement of the said members; and means controllable by said manual means for releasing such catch means so that the resilient member may effect engagement of the said co-acting friction members below the said rotative speed and under the control of the said manual means.

7. An automatic clutch comprising relatively movable co-acting driving and driven friction members, a spring plate member adjacent to one of the movable friction members, cushion springs between the said spring plate member and its adjacent friction member, releasable catch means holding the said springs in a preloaded condition to permit disengagement of the friction members, a back member behind the spring plate member, means responsive to the rotative speed of the driving member between the spring plate member and the back member engaging the former to bring the friction members into engagement, and manual means separate from the catch means for separating the co-acting friction members for clutch disengagement.

8. The combination with an automatic clutch embodying relatively movable co-acting friction members, a spring plate adjacent a movable friction member, and means acting on the spring plate and responsive to the rotative speed of the driving member for moving said members into engagement above a predetermined rotative speed, including springs between the spring plate and the adjacent friction member having catch means for holding them in a pre-loaded condition to permit clutch release below the predetermined rotative speed, said springs being arranged to be further compressed by said movement and determining the pressure of engagement of the said friction members; manual means for disengaging said members by compressing said resilient member and means for releasing such catch means so that the spring may effect engagement of the said co-acting friction members below the said rotative speed and under the control of the said manual means, said catch means comprising a stud, having a shoulder and a pivoted catch adapted to be engaged with or disengaged from the said shoulder.

9. The combination with an automatic clutch embodying relatively movable co-acting friction members, a spring plate adjacent a movable friction member, and means acting on the spring plate and responsive to the rotative speed of the driving member for moving said members into engagement above a predetermined rotative speed, including springs between the spring plate and the adjacent friction member having catch means for holding them in a pre-loaded condition to permit clutch release below the predetermined rotative speed, said springs being arranged to be further compressed by said movement and determining the pressure of engagement of the said friction members; manual means for disengaging said member by compressing said resilient member and means for releasing such catch means so that the spring may effect engagement of the said co-acting friction members below the said rotative speed and under the control of the said manual means, said catch means comprising a stud, having a shoulder and a pivoted catch adapted to be engaged with or disengaged from the said shoulder, the pivoted catch member being movable in one direction by a spring and in the other direction by centrifugal force.

10. The combination with an automatic clutch embodying relatively movable co-acting friction members, a spring plate adjacent a movable friction member, and means acting on the spring plate and responsive to the rotative speed of the driving member for moving said members into engagement above a predetermined rotative speed, including springs between the spring plate and the adjacent friction member, having catch means for holding them in a pre-loaded condition to permit clutch release below the predetermined rotative speed, said springs being arranged to be further compressed by said movement and determining the pressure of engagement of the said friction members; manual means for disengaging said members by compressing said resilient members and means for releasing such catch means so that the springs may effect engagement of the said co-acting friction members below the said rotative speed and under the control of the said manual means, said catch means comprising a stud, having a shoulder, a pivoted catch adapted to be engaged with or disengaged from the said shoulder, the catch being pivoted so as to be removed by centrifugal force into engagement with the shoulder, and a light spring adapted to move the catch out of engagement with the shoulder, the spring being of such strength as to be normally overpowered by centrifugal force and unable to release the catch whilst loaded.

11. The combination with an automatic clutch embodying relatively movable co-acting friction members, a spring plate adjacent a movable friction member and means acting on the spring plate and responsive to the rotative speed of the driving member for moving said members into engagement above a predetermined rotative speed, including springs between the spring plate and the adjacent friction member having catch means for holding them in a pre-loaded condition to permit clutch release below the predetermined rotative speed, said springs being arranged to be further compressed by said movement and determining the pressure of engagement of the said friction members; manual means for disengaging said members by compressing said springs and means for releasing such catch means so that the resilient member may effect engagement of the said co-acting friction members below the said rotative speed and under the control of the said manual means, said catch means comprising a stud, having a shoulder and a pivoted catch adapted to be engaged with or disengaged from the said shoulder, the said stud also acting to carry one of the movable co-acting friction members for the direct transmission of torque.

NOEL BANNER NEWTON.